United States Patent
Park et al.

(10) Patent No.: US 11,644,716 B2
(45) Date of Patent: May 9, 2023

(54) BACKLIGHT UNIT AND DISPLAY DEVICE

(71) Applicant: LG Display Co., Ltd., Seoul (KR)

(72) Inventors: MyungJoon Park, Paju-si (KR); SangChul Ryu, Paju-si (KR); DongSeok Lee, Paju-si (KR); Suhun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/860,083

(22) Filed: Jul. 7, 2022

(65) Prior Publication Data

US 2023/0016232 A1 Jan. 19, 2023

(30) Foreign Application Priority Data

Jul. 13, 2021 (KR) .................. 10-2021-0091865

(51) Int. Cl.
*G02F 1/00* (2006.01)
*G02F 1/13357* (2006.01)

(52) U.S. Cl.
CPC .. *G02F 1/133605* (2013.01); *G02F 1/133603* (2013.01); *G02F 1/133606* (2013.01)

(58) Field of Classification Search
None
See application file for complete search history.

(56) References Cited

U.S. PATENT DOCUMENTS

| | | | |
|---|---|---|---|
| 2014/0233212 A1* | 8/2014 | Park | G02F 1/133606 362/361 |
| 2015/0021634 A1* | 1/2015 | Ishihara | G02F 1/133611 257/88 |
| 2015/0219936 A1* | 8/2015 | Kim | G02F 1/0105 977/950 |
| 2018/0356685 A1* | 12/2018 | Jang | G02F 1/133603 |
| 2020/0233141 A1* | 7/2020 | Yang | G02F 1/133607 |
| 2020/0371397 A1* | 11/2020 | An | G02B 5/28 |
| 2021/0367116 A1* | 11/2021 | Eom | H01L 33/60 |

FOREIGN PATENT DOCUMENTS

WO WO-2019225877 A1 * 11/2019 ............ F21K 9/64

* cited by examiner

*Primary Examiner* — Gerald J Sufleta, II
(74) *Attorney, Agent, or Firm* — Fenwick & West LLP

(57) ABSTRACT

Embodiments of the present disclosure are related to a backlight unit and a display device, and the backlight unit in which an optical plate including an engraved pattern in which a color conversion material is disposed is positioned on a light source can be provided. As the color conversion material is disposed in the engraved pattern, a change of the color conversion material by an external factor can be prevented and an amount of the color conversion material can be reduced, thus the backlight unit providing an image quality greater or equal to a certain level and with improved reliability can be implemented easily.

23 Claims, 13 Drawing Sheets

FIG.4B
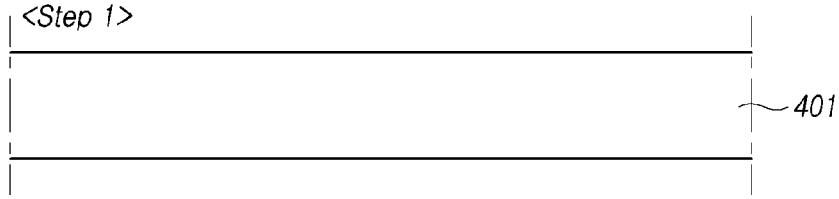
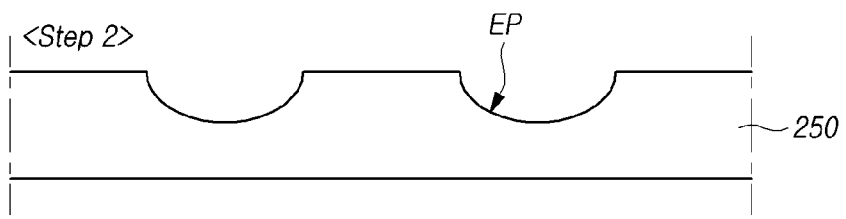
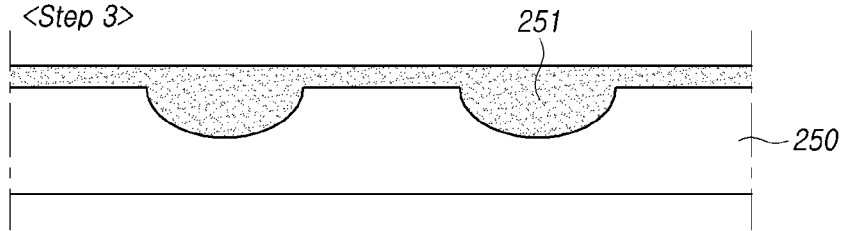
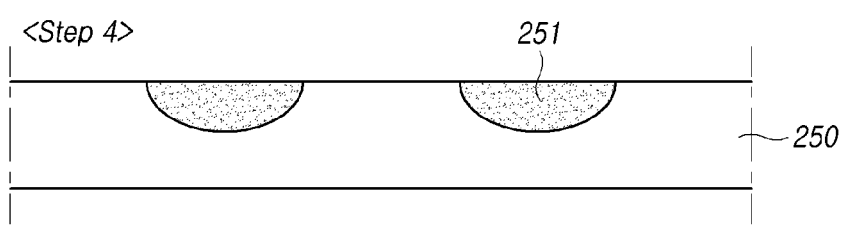

FIG.8
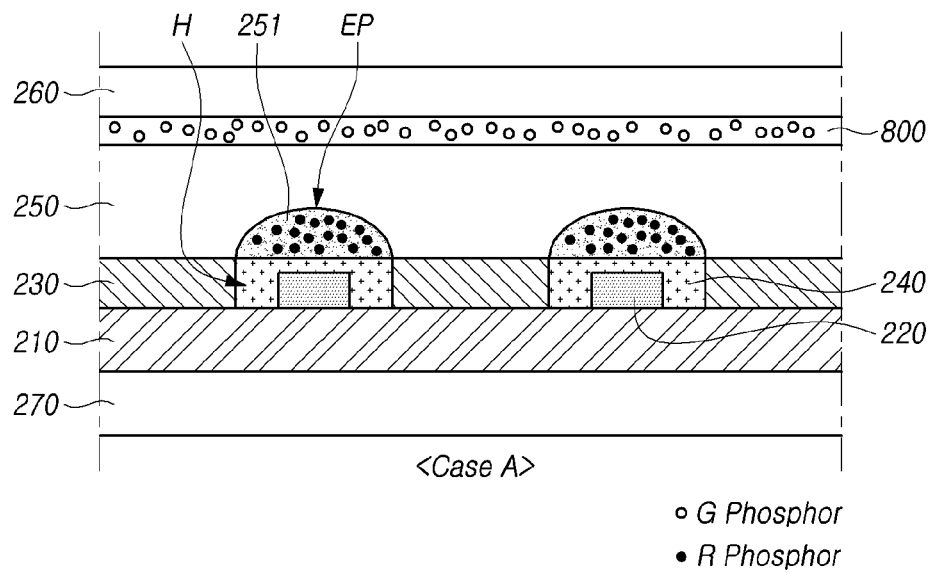
<Case A>
○ G Phosphor
● R Phosphor
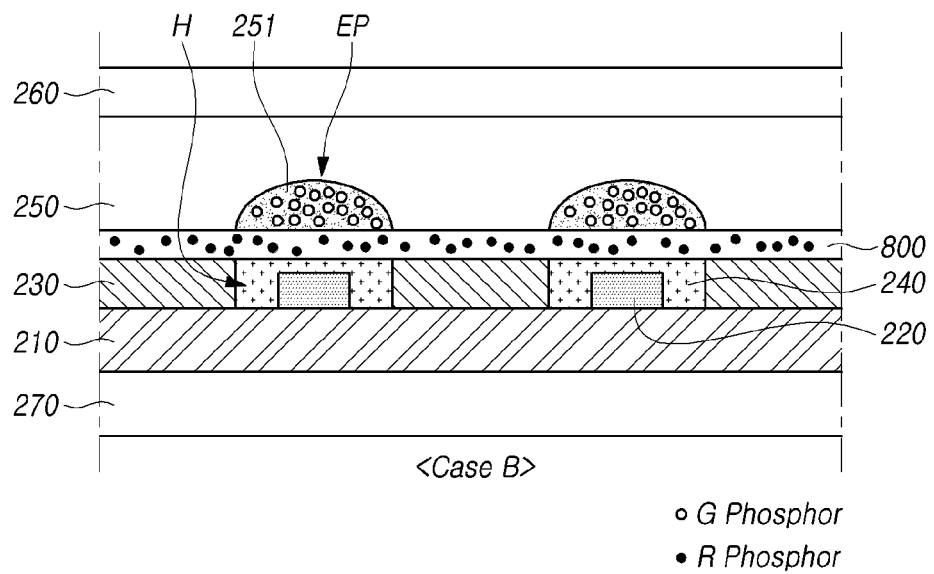
<Case B>
○ G Phosphor
● R Phosphor

FIG.10
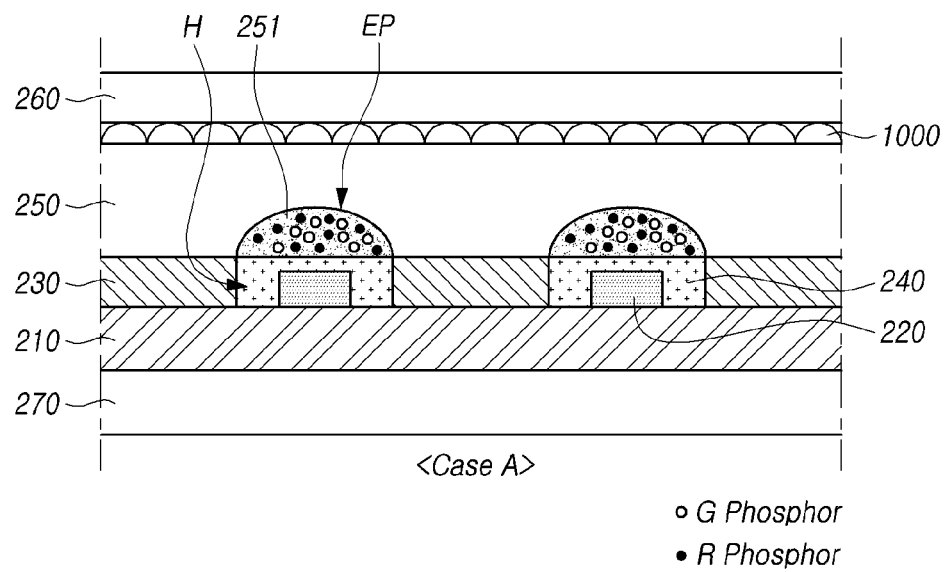
<Case A>
○ G Phosphor
● R Phosphor
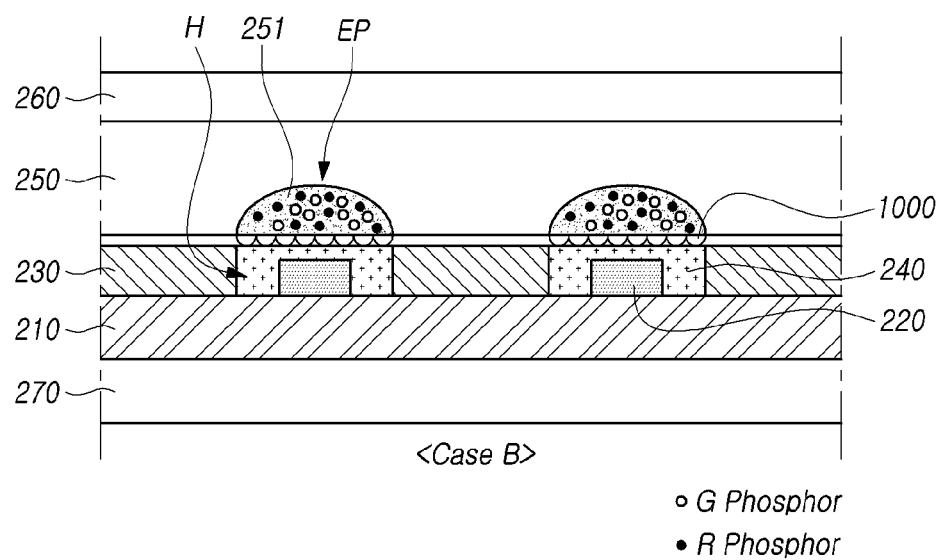
<Case B>
○ G Phosphor
● R Phosphor

FIG.12
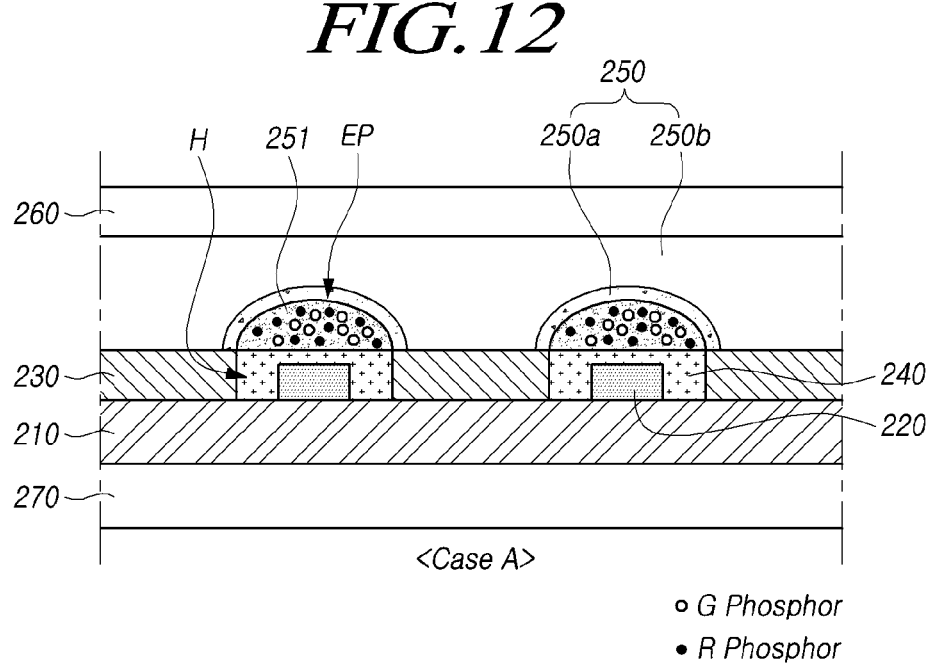
<Case A>
○ G Phosphor
● R Phosphor
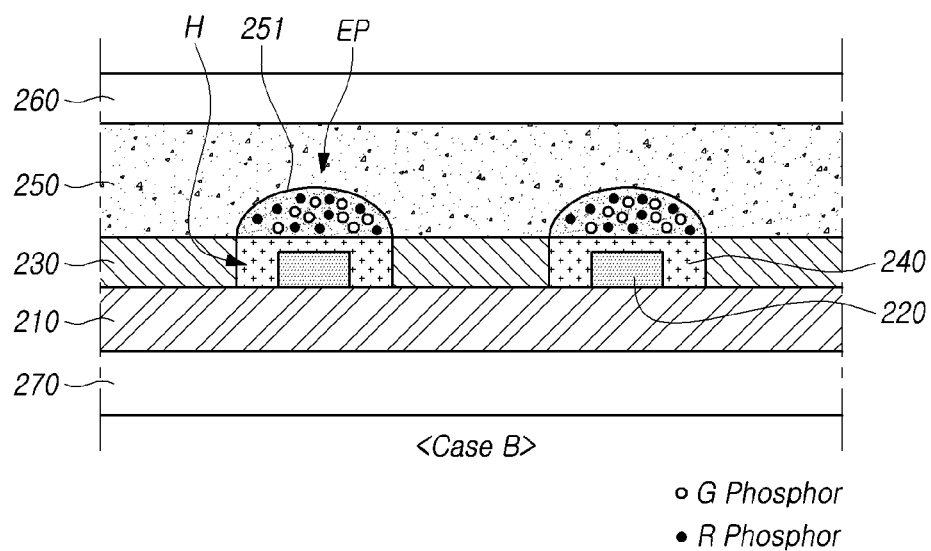
<Case B>
○ G Phosphor
● R Phosphor

BACKLIGHT UNIT AND DISPLAY DEVICE

CROSS REFERENCE TO RELATED APPLICATION

This application claims priority from Korean Patent Application No. 10-2021-0091865, filed on Jul. 13, 2021, which is hereby incorporated by reference for all purposes as if fully set forth herein.

BACKGROUND

Field

Embodiments of the present disclosure are related to a backlight unit and a display device.

Description of Related Art

The growth of the information society leads to increased demand for display devices to display images and use of various types of display devices, such as liquid crystal display devices, organic light emitting display devices, etc.

The liquid crystal display devices can include a display panel, and a light source device such as a backlight unit supplying light to the display panel.

The display panel can display an image by controlling a degree that a light supplied from the backlight unit is transmitted.

As quality of an image displayed by the display panel can be different according to an image quality that the backlight unit represents, methods capable of improving the image quality and reliability of the backlight unit are required.

SUMMARY

Embodiments of the present disclosure provide a backlight unit in which an image quality and reliability are improved and a display device including the same.

Embodiments of the present disclosure provide a backlight unit which represents an image quality of a certain level and whose overall thickness is reduced, and a display device including the same.

Embodiments of the present disclosure provide a backlight unit including a plurality of light sources on a substrate, a reflector on the substrate and including a plurality of holes and wherein at least some of the plurality of holes are configured to accommodate each of the light sources, and an optical plate positioned on the plurality of light sources and the reflector and wherein the optical plate further comprises a plurality of engraved patterns on a bottom surface corresponding to each of the plurality of light sources and a color conversion portion including a color conversion material which is disposed inside of the plurality of engraved patterns.

Embodiments of the present disclosure provide a backlight unit including a plurality of light sources on a substrate, a reflector on the substrate disposed on at least a part area of an area not overlapping the plurality of light sources, and an optical plate positioned on the reflector, and wherein the optical plate includes a plurality of first engraved patterns corresponding to each of the plurality of light sources, and at least one second engraved patterns not corresponding to the plurality of light sources, wherein a color conversion portion including a color conversion material is disposed inside of the plurality of first engraved patterns and the at least one second engraved pattern.

Embodiments of the present disclosure provide a display device including a backlight unit above-mentioned, and a display panel supplied light from the backlight unit.

According to various embodiments of the present disclosure, a backlight unit which maintains image quality and whose reliability is improved, and a display device including the same, can be provided.

According to various embodiments of the present disclosure, a backlight unit in which an image quality is improved and whose overall thickness is reduced, and a display device including the same, can be provided.

BRIEF DESCRIPTION OF THE DRAWINGS

The above and other objects, features, and advantages of the present disclosure will be more clearly understood from the following detailed description, taken in conjunction with the accompanying drawings, in which:

FIGS. 4A and 4B are diagrams illustrating an example of a method of manufacturing an optical plate illustrated in FIG. 3;

FIGS. 8 to 12 are cross-sectional views of another example of a backlight unit according to embodiments of the present disclosure.

DETAILED DESCRIPTION

Figure 1:
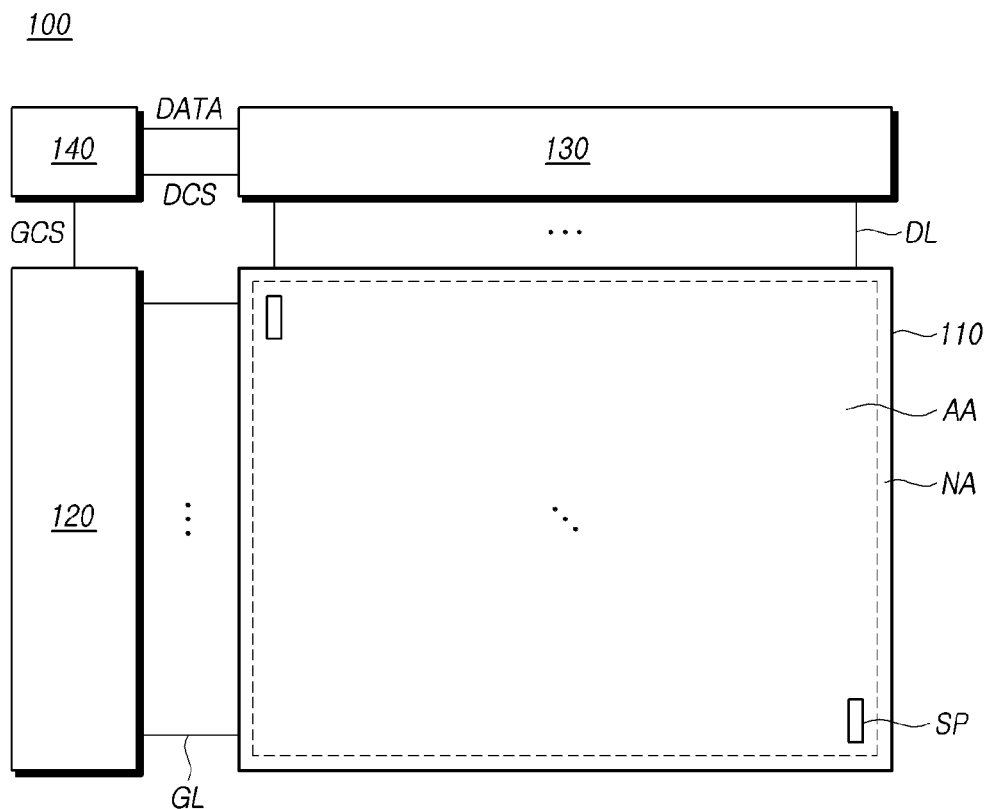
FIG. 1 is a diagram schematically illustrating a configuration included in a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

Hereinafter, various embodiments of the present disclosure will be described in detail with reference to accompanying drawings.

FIG. 1 is a diagram schematically illustrating a configuration included in a display device 100 according to embodiments of the present disclosure. All the components of the display device 100 according to all embodiments of the present disclosure are operatively coupled and configured.

Referring to FIG. 1, the display device 100 can include a display panel 110, and a gate driving circuit 120, a data driving circuit 130 and a controller 140 for driving the display panel 110.

The display panel 110 can include an active area AA where a plurality of subpixels SP are disposed, and a non-active area which is located outside the active area AA.

A plurality of gate lines GL and a plurality of data lines DL can be arranged on the display panel 110. The plurality of subpixels SP can be located in areas where the gate lines GL and the data lines DL intersect each other.

The gate driving circuit 120 is controlled by the controller 140, and sequentially outputs scan signals to the plurality of gate lines GL arranged on the display panel 110, thereby controlling the driving timing of the plurality of subpixels SP.

The gate driving circuit 120 can include one or more gate driver integrated circuits GDIC, and can be located only at one side of the display panel 110, or can be located at both sides thereof according to a driving method.

Each gate driver integrated circuit GDIC can be connected to a bonding pad of the display panel 110 by a tape automated bonding TAB method or a chip-on-glass COG method. Each gate driver integrated circuit GDIC can be implemented by a gate-in-panel GIP method to then be directly arranged on the display panel 110. In some cases, the gate driver integrated circuit GDIC can be integrated and arranged on the display panel 110. Alternatively, each gate driver integrated circuit GDIC can be implemented by a chip-on-film COF method in which an element is mounted on a film connected to the display panel 110.

The data driving circuit 130 receives image data from the controller 140 and converts the image data into an analog data voltage Vdata. Then, the data driving circuit 130 outputs the data voltage Vdata to each data line DL according to the timing at which the scan signal is applied through the gate line GL so that each of the plurality of subpixels SP emits light having brightness according to the image data.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding TAB method or a chip-on-glass COG method. Each source driver integrated circuit SDIC can be directly disposed on the display panel 110. In some cases, the source driver integrated circuit SDIC can be integrated and arranged on the display panel 110. Alternatively, each source driver integrated circuit SDIC can be implemented by a chip-on-film COF method. In this case, each source driver integrated circuit SDIC can be mounted on a film connected to the display panel 110, and can be electrically connected to the display panel 110 through wires on the film.

The controller 140 supplies various control signals to the gate driving circuit 120 and the data driving circuit 130, and controls the operation of the gate driving circuit 120 and the data driving circuit 130.

The controller 140 can be mounted on a printed circuit board, a flexible printed circuit, or the like, and can be electrically connected to the gate driving circuit 120 and the data driving circuit 130 through the printed circuit board, the flexible printed circuit, or the like.

The controller 140 can allow the gate driving circuit 120 to output a scan signal according to the timing implemented in each frame. The controller 140 can convert a data signal received from the outside to conform to the data signal format used in the data driving circuit 130 and then output the converted image data to the data driving circuit 130.

The controller 140 receives, from the outside (e.g., a host system), various timing signals including a vertical synchronization signal VSYNC, a horizontal synchronization signal HSYNC, an input data enable DE signal, a clock signal CLK, and the like, as well as the image data.

The controller 140 can generate various control signals using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, a gate output enable signal GOE, or the like.

The gate start pulse GSP controls operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP controls a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

According to types of the display device 100, a liquid crystal or a light-emitting element can be disposed on the subpixel SP included in the display panel 110.

In the case that the display device 100 is a liquid crystal display device, the display device 100 can include a backlight unit supplying a light to the display panel 110.

The backlight unit can include an element emitting a light, and various optical members increasing an efficiency of the light emitted from the element.

Embodiments of the present disclosure can provide methods capable of reducing an overall thickness of the display device 100 through thickness reduction of the backlight unit. Furthermore, embodiments of the present disclosure provide methods for improving a quality of an image displayed by the display device 100 as well as the reliability of the backlight unit.

Figure 2:
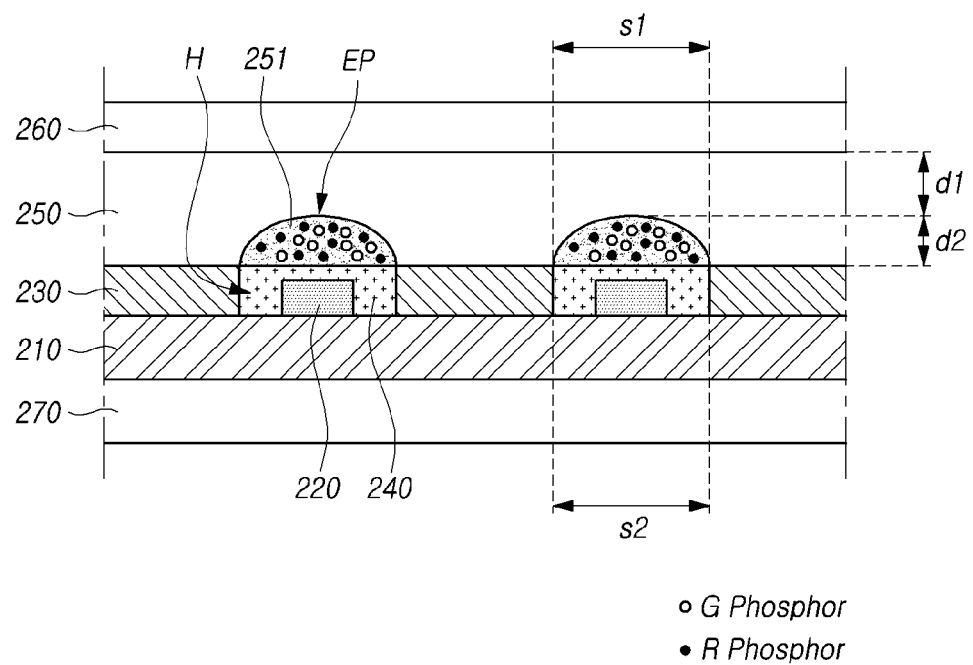
FIG. 2 is a cross-sectional view of an example of a backlight unit according to embodiments of the present disclosure.
Figure 3:
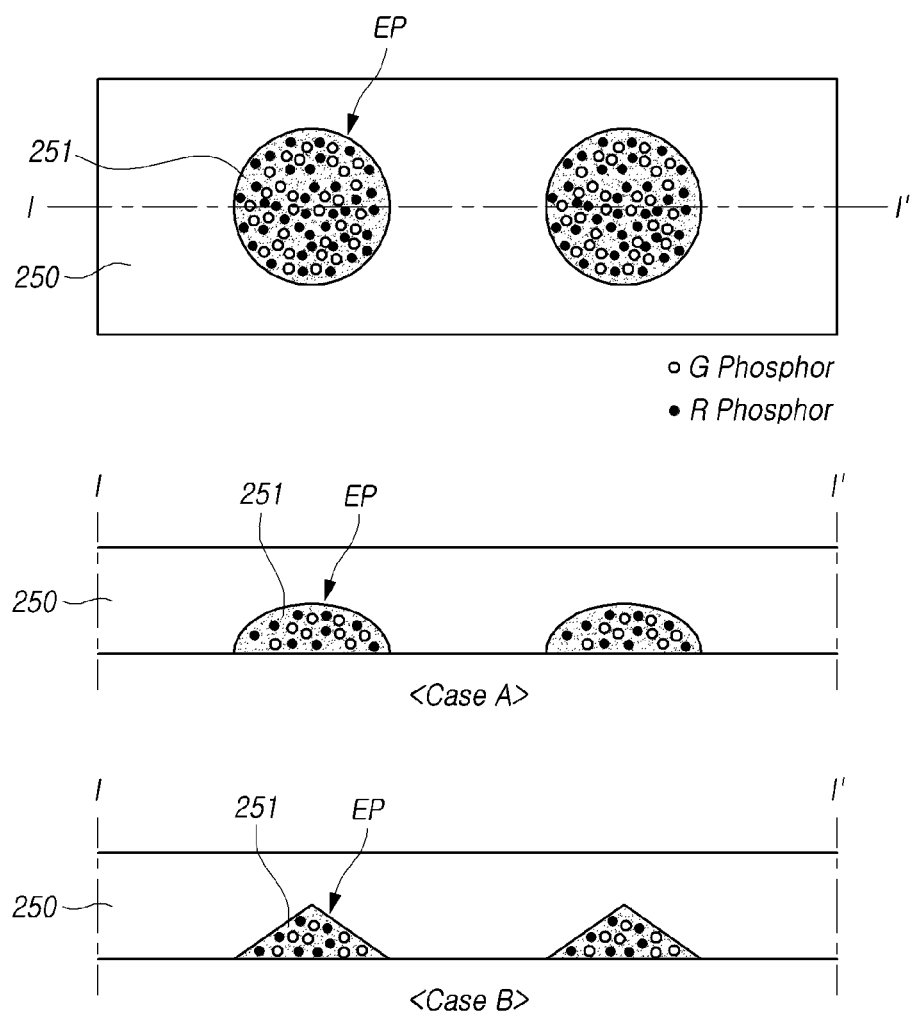
FIG. 3 is a plane view and a cross-sectional view of an example of an optical plate included in a backlight unit illustrated in FIG. 2.
Figure 4A:
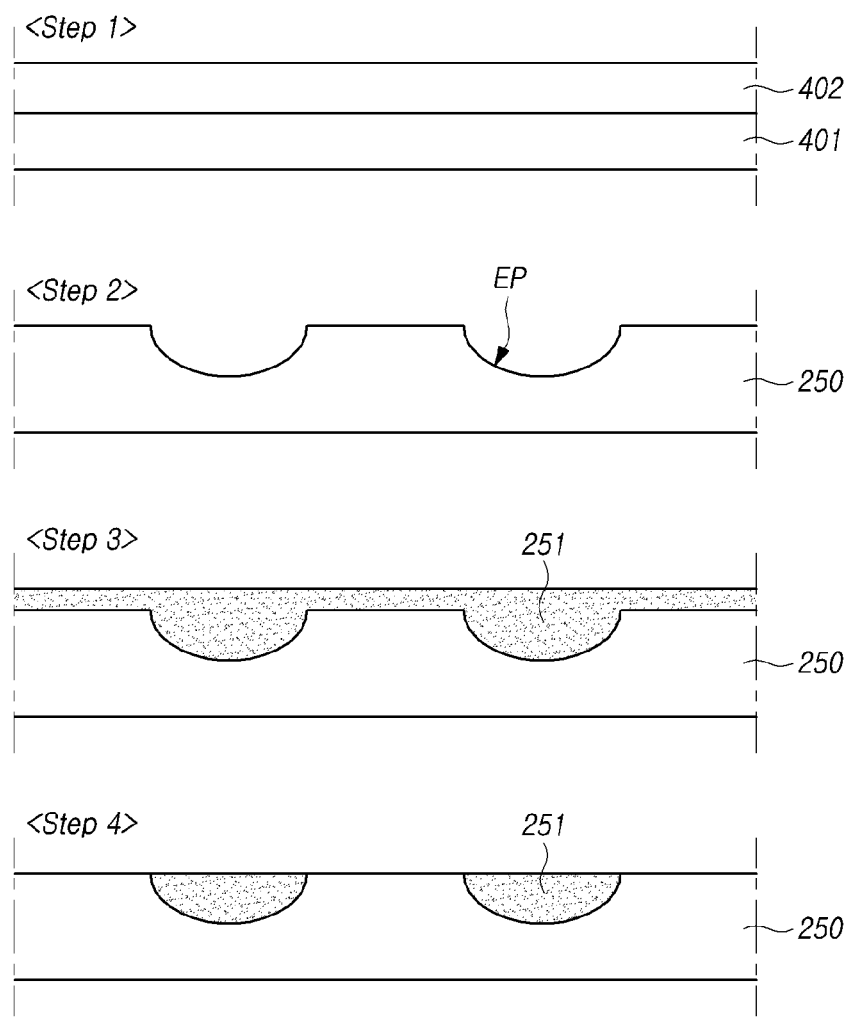

FIG. 2 is a cross-sectional view of an example of a backlight unit according to embodiments of the present disclosure. FIG. 3 is a plane view and a cross-sectional view of an example of an optical plate 250 included in the backlight unit illustrated in FIG. 2. FIGS. 4A and 4B are diagrams illustrating an example of a method of manufacturing the optical plate 250 illustrated in FIG. 3.

Referring to FIG. 2, the backlight unit can include a plurality of light sources 220 and various optical members.

The light source 220, for example, can be a light-emitting diode. The light source 220 can be a mini light-emitting diode having a size of hundreds μm, or a micro light-emitting diode having a size of dozens μm.

The plurality of light-emitting diode 220 can be mounted on a substrate 210.

The substrate 210, for example, can be a printed circuit board. The substrate 210 can be a flexible printed circuit. In some cases, the substrate 210 can be a substrate made of glass.

A reflector 230 can be disposed on the substrate 210. The reflector 230 can be disposed on at least a part of an area where the light source 220 is not disposed on the substrate 210.

The reflector 230 can include a plurality of holes H. At least some of the plurality of holes H can be positioned to correspond to the light source 220 respectively.

The light source 220 can be positioned inside of the hole H included in the reflector 230. The light source 220 can be separated from an inside surface of the hole H of the reflector 230.

A top end of the reflector 230 can be positioned higher than a top end of the light source 220.

A light source protection portion 240 can be disposed inside of the hole H of the reflector 230. The light source protection portion 240 can be disposed to enclose the light source 220.

The light source protection portion 240, for example, can be made of resin, but not limited to this.

The light source protection portion 240 can perform a function protecting the light source 220. The light source protection portion 240 can perform a function light-guiding light emitted from the light source 220. The light source protection portion 240 can be made of a material having a high refractive index and can improve a diffusion performance of light emitted from the light source 220.

The light source protection portion 240 may not be disposed inside of the hole H of the reflector 230. In this case, an air layer can be present inside of the hole H of the reflector 230.

An optical plate 250 can be disposed on the light source 220 and the reflector 230.

At least one optical sheet 260 can be disposed on the optical plate 250.

The substrate 210 on which the light source 220 is mounted and various optical members can be accommodated by a cover bottom 270.

The optical plate 250 can include a plurality of engraved patterns EP.

The plurality of engraved patterns EP can be positioned on a bottom surface of the optical plate 250.

Each of the plurality of engraved patterns EP can be positioned in an area corresponding to each of the plurality of light sources 220. Each of the plurality of engraved patterns EP can be positioned to correspond to the hole H of the reflector 230.

A color conversion portion 251 can be disposed inside of the plurality of engraved patterns EP. The color conversion portion 251 can include a color conversion material such as phosphor. The color conversion portion 251, for example, can be made by a mixture of phosphor and resin and disposed in the engraved pattern EP.

As the engraved pattern EP in which the color conversion portion 251 is disposed is positioned on the light source 220, a wavelength of light emitted from the light source 220 can be converted by the color conversion portion 251.

For example, the light source 220 can emit a blue light, and some of the blue light entering the color conversion portion 251 can be converted to a green light or a red light. Thus, a white light can be supplied to the display panel 110.

The color conversion portion 251 can be disposed to cover a top surface of the hole H of the reflector 230 for a wavelength conversion of light emitted from the light source 220. A size s1 of the engraved pattern EP can be greater or equal to a size s2 of the hole H.

A light whose wavelength is converted by the color conversion portion 251 can be output to an upper area of the optical plate 250 through the optical plate 250. A portion other than the engraved pattern EP of the optical plate 250 can perform a function of light-guiding light passing through the color conversion portion 251.

For sufficient light-guiding of a light, a vertical distance d1 between the deepest point of the engraved pattern EP and a top surface of the optical plate 250 can be greater than a vertical distance d2 between the deepest point of the engraved pattern EP and a bottom surface of the optical plate 250.

As the optical plate 250 in which the color conversion portion 251 is disposed inside the engraved pattern EP is disposed on the reflector 230, a structure for a wavelength conversion of light emitted from the light source 220 can be implemented easily.

As the color conversion portion 251 is positioned on the light source 220 only, a wavelength conversion function can be implemented while an amount of a color conversion material used for implementing the color conversion portion 251 is reduced.

As the color conversion portion 251 is positioned inside the engraved pattern EP included in the optical plate 250, the color conversion portion 251 may not be exposed to outside. As the color conversion portion 251 is not exposed to outside, abnormality of a color conversion material that can be caused by an external factor such as a moisture or the like can be prevented from occurring.

As embodiments of the present disclosure reduce an amount of color conversion material and implement a color conversion function, and prevent abnormality of the color conversion material from occurring, image quality of the backlight unit can be maintained and reliability of the backlight unit can be improved.

A refractive index of the color conversion portion 251 can be identical to a refractive index of the optical plate 250, or can be different from that. As the color conversion portion 251 is disposed inside the engraved pattern EP of the optical plate 250, a refractive index of a material constituting the color conversion portion 251 can be different from a refractive index of the optical plate 250.

For example, by constituting the color conversion portion 251 by using a material having a refractive index higher than a refractive index of the optical plate 250, a diffusion performance of light passing through the color conversion portion 251 can be improved.

Furthermore, a shape of the engraved pattern EP in which the color conversion portion 251 is disposed can vary.

For example, referring to FIG. 3, the engraved pattern EP can be a hemisphere or a shape similar to a hemisphere such as Case A. Alternatively, the engraved pattern EP can be a cone shape such as Case B.

The engraved pattern EP can have various shapes capable of covering the hole H of the reflector 230.

A center of the engraved pattern EP can be an area where an intensity of light emitted from the light source 220 is the strongest. The engraved pattern EP can have a shape where a depth of the engraved pattern EP decreases from the center of the engraved pattern EP to an outer edge of the engraved pattern EP.

The optical plate 250 can be made by using one material or two or more materials depending on a processing method.

For example, referring to FIG. 4A, a second material 402 can be disposed on a first material 401 for fabricating the optical plate 250. The first material 401, for example, can be a material such as PET constituting the optical plate 250, but not limited to this. The second material 402, for example, can be a resin for hardening.

The second material 402 can be applied on the first material 401 before hardening (Step 1).

A shape of the engraved pattern EP can be imprinted on the second material 402, and the second material 402 can be hardened (Step 2).

A shape of the optical plate 250 including the engraved pattern EP can be made by the first material 401 and the second material 402 which is hardened on the first material 401.

The color conversion portion 251 can be applied on the engraved pattern EP (Step 3). The color conversion portion 251, for example, can be a mixture of phosphor and resin.

One surface of the optical plate 250 on which the color conversion portion 251 is applied can be polished, and the color conversion portion 251 disposed on an area other than the engraved pattern EP can be removed (Step 4).

The optical plate 250 where the color conversion portion 251 is disposed inside the engraved pattern EP can be manufactured.

As the first material 401 and the second material 402 are used for an implementation of the optical plate 250, a light diffusion performance of the optical plate 250 can be improved by using materials having different refractive indexes.

For another example, referring to FIG. 4B, the optical plate 250 can be fabricated by using a single material.

For fabricating the optical plate 250, the first material 401 can be heated (Step 1).

In a state that the first material 401 has flexibility, for example, a shape of the engraved pattern EP can be imprinted on the first material 401 by stamping (Step 2).

The color conversion portion 251 can be applied on the engraved pattern EP (Step 3). One surface of the optical plate 250 can be polished, and the optical plate 250 where the color conversion portion 251 is disposed inside the engraved pattern EP can be manufactured (Step 4).

As the optical plate 250 is put on the reflector 230, a color conversion function and a light-guiding function can be implemented easily. A method of manufacture of the backlight unit can be simplified, and the backlight unit in which an image quality is maintained and reliability of the color conversion portion 251 is improved can be provided.

The optical plate 250 can further include at least one engraved pattern EP positioned in an area not corresponding to the light source 220.

By arranging a color conversion material or other material in the engraved pattern EP positioned in an area not corresponding to the light source 220, various functions capable of improving an image quality of the backlight unit can be implemented.

Figure 5:
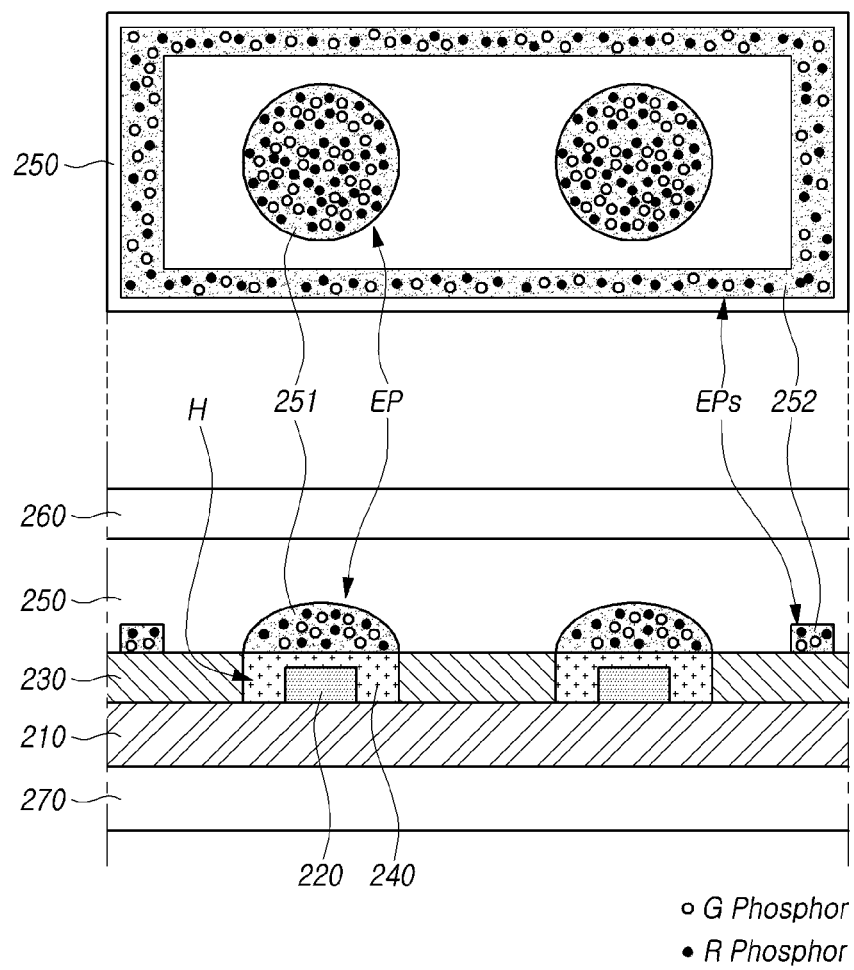
FIGS. 5 to 7 are cross-sectional views of a backlight unit including another example of an optical plate according to embodiments of the present disclosure.
Figure 6:
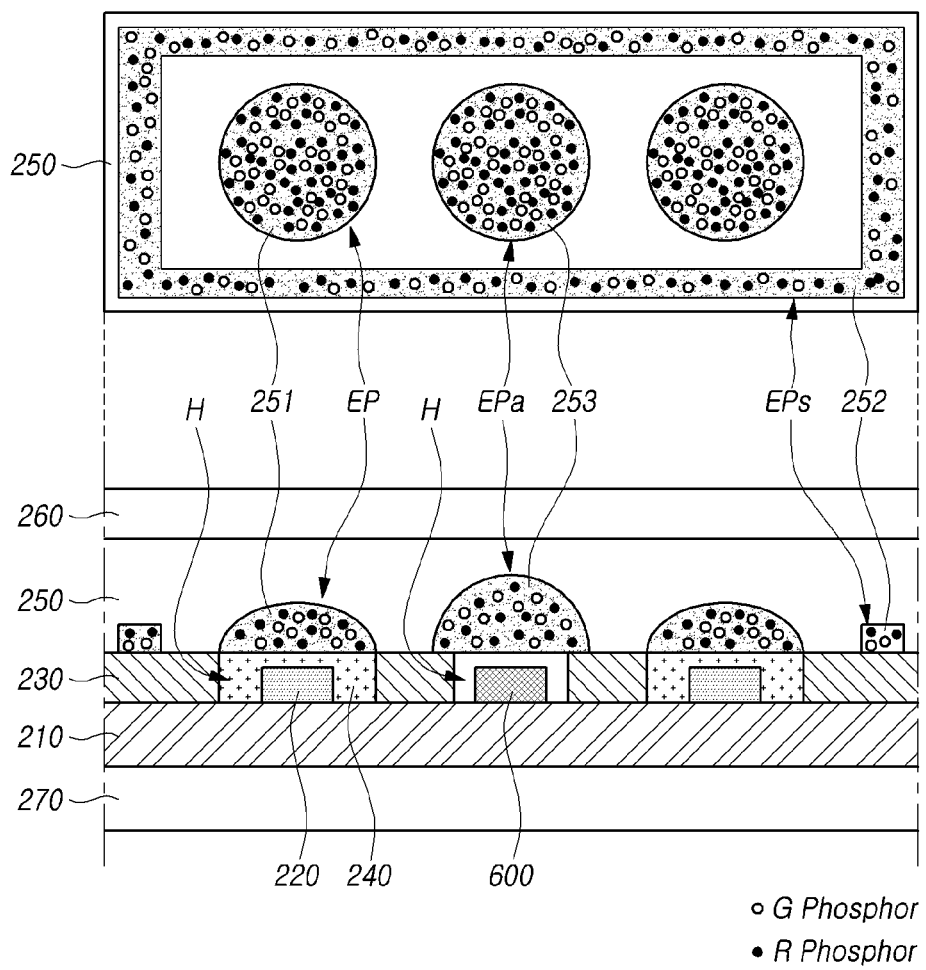
Figure 7:
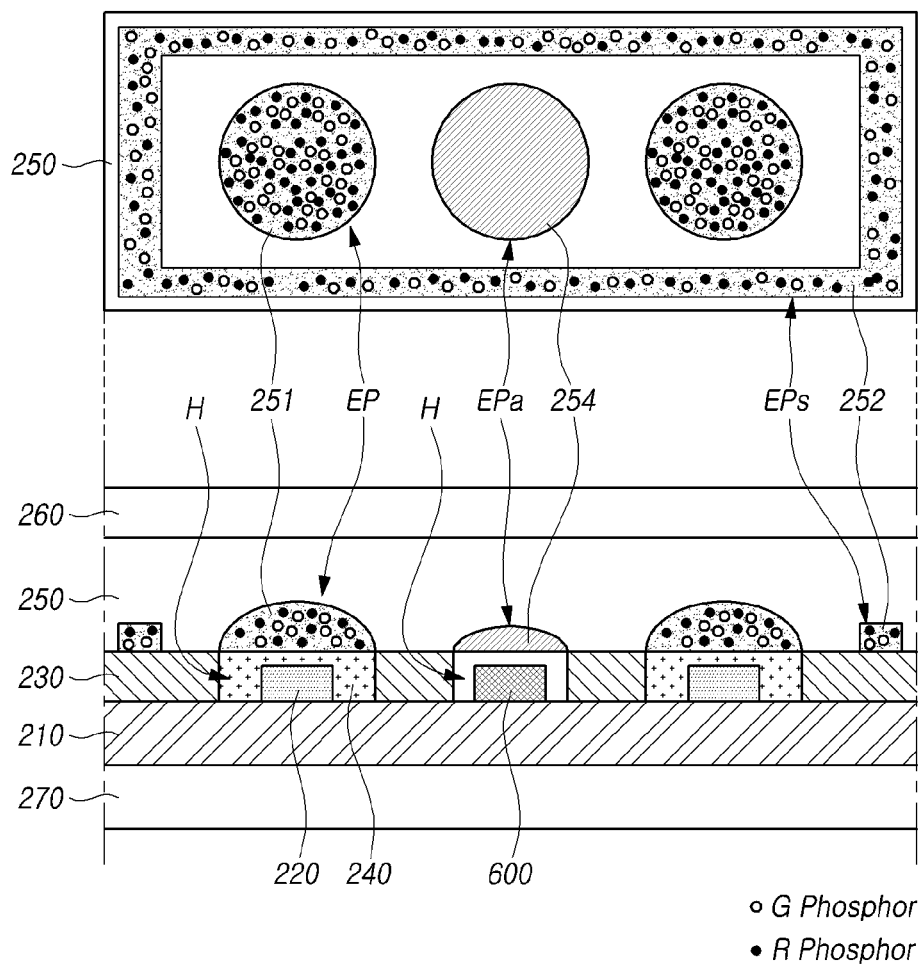

FIGS. 5 to 7 are cross-sectional views of the backlight unit including another example of the optical plate 250 according to embodiments of the present disclosure.

Referring to FIG. 5, the optical plate 250 can include the engraved pattern EP positioned in an area corresponding to the light source 220. The color conversion portion 251 including a color conversion material can be disposed inside the engraved pattern EP.

The optical plate 250 can include at least one auxiliary engraved pattern EPs positioned in an area other than an area overlapping the light source 220.

The auxiliary engraved pattern EPs, for example, can be positioned along an outer edge of the optical plate 250. The outer edge of the optical plate 250 can mean an area overlapping an outer edge of the backlight unit, or being adjacent to the outer edge of the backlight unit.

The auxiliary engraved pattern EPs can be positioned to surround the plurality of engraved patterns EP.

An auxiliary color conversion portion 252 including a color conversion material can be disposed inside of the auxiliary engraved pattern EPs.

A shape of the auxiliary engraved pattern EPs can be identical to a shape of the engraved pattern EP, or different from the shape of the engraved pattern EP.

For example, a depth of the auxiliary engraved pattern EPs can be smaller than a depth of the engraved pattern EP. Whereas a bottom surface of the engraved pattern EP can be a curved surface or an inclined surface, a bottom surface of the auxiliary engraved pattern EPs can be flat.

A size of the auxiliary engraved pattern EPs can be smaller than a size of the engraved pattern EP. A density of a color conversion material disposed in the auxiliary engraved pattern EPs can be smaller than a density of a color conversion material disposed in the engraved pattern EP.

As the auxiliary engraved pattern EPs is not positioned on the light source 220, a light light-guided through the optical plate 250 can reach the auxiliary engraved pattern EPs.

A wavelength of light reaching the auxiliary engraved pattern EPs can be converted by the auxiliary color conversion portion 252 inside the auxiliary engraved pattern EPs. A supply of white light can be increased on an outer edge of the optical plate 250 by the auxiliary color conversion portion 252 disposed in the auxiliary engraved pattern EPs.

A difference of an image quality between a central area and an outer edge area of the backlight unit can be reduced. An overall image quality of the backlight unit can be improved.

The auxiliary engraved pattern EPs can be disposed in an area where the hole H of the reflector 230 is not positioned.

The engraved pattern EP can be positioned in an area where the hole H of the reflector 230 is positioned and the light source 220 is not disposed inside the hole H.

Referring to FIG. 6, the optical plate 250 can include the engraved pattern EP positioned on the light source 220. The optical plate 250 can include the auxiliary engraved pattern EPs positioned along the outer edge of the optical plate 250. In some cases, the optical plate 250 may not include the auxiliary engraved pattern EPs.

The optical plate 250 can include at least one additional engraved pattern EPa positioned on the hole H of the reflector 230 in which the light source 220 is not disposed.

The reflector 230 can include at least one hole H in which the light source 220 is not disposed. A size and a shape of the hole H in which the light source 220 is not disposed can be identical to or different from a size and a shape of the hole H in which the light source 220 is disposed.

A circuit component 600 can be disposed inside the hole H of the reflector 220 in which the light source 220 is not disposed. The circuit component 600, for example, can be a circuit driving the light source 220, or an element for an electrostatic discharge.

As the circuit component 600 is disposed on a same surface as a surface on which the light source 220 is disposed on the substrate 210, a thickness of the backlight unit can be reduced. As the circuit component 600 is positioned in the active area AA where the light source 220 is disposed, an area of the non-active area NA can be reduced.

As the hole H in which the circuit component 600 is disposed is positioned between the light sources 220, it can be an area where an amount of light is smaller compared to an area where the light source 220 is disposed.

The additional engraved pattern EPa can be positioned on the hole H in which the circuit component 600 is disposed. An additional color conversion portion 253 including a color conversion material can be disposed inside the additional engraved pattern EPa. A wavelength of light reaching an area between the light sources 220 can be converted by the additional color conversion portion 253. A supply of white light can increase in an area between the light sources 220.

A shape of the additional engraved pattern EPa can be similar to, or different from a shape of the engraved pattern EP.

As the additional engraved pattern EPa is positioned in an area where an amount of light is small, a depth of the additional engraved pattern EPa can be greater than a depth of the engraved pattern EP. An amount or a density of a color conversion material disposed in the additional engraved pattern EPa can be greater than an amount or a density of a color conversion material disposed in the engraved pattern EP.

As the additional engraved pattern EPa in which a color conversion material is disposed is positioned in an area between the light sources 220, uniformity of white light can be improved.

A light blocking layer can be further positioned for hiding of the circuit component 600 positioned under the additional engraved pattern EPa. The light blocking layer can be disposed on outer surface of the additional color conversion portion 253. For example, the light blocking layer can be disposed by a method of printing an ink on the outer surface of the additional color conversion portion 253.

Supply of white light can increase in an area where the circuit component 600 is disposed, and a hiding function of the circuit component 600 can be implemented.

In the case where white light supplied on an area where the circuit component 600 is disposed is sufficient, only a function for hiding the circuit component 600 can be implemented by the additional engraved pattern EPa.

Referring to FIG. 7, the optical plate 250 can include the engraved pattern EP and the auxiliary engraved pattern EPs. The optical plate 250 can include the additional engraved pattern EPa positioned on the circuit component 600.

A light blocking portion 254 including a light diffusion material can be disposed inside the additional engraved pattern EPa. For example, the light blocking portion 254 can be implemented by mixing a light diffusion material and a resin.

In the case where the light blocking portion 254 is disposed in the additional engraved pattern EPa, a size or a depth of the additional engraved pattern EPa can be smaller than a size or a depth of the engraved pattern EP.

A hiding function of the circuit component 600 can be easily implemented by the light blocking portion 254, and a structure of the backlight unit can be simplified.

Furthermore, embodiments of the present disclosure can further improve optical performance provided by the optical plate 250 by an additional optical layer positioned on an upper portion or a lower portion of the optical plate 250.

FIGS. 8 to 12 are cross-sectional views of another example of the backlight unit according to embodiments of the present disclosure.

FIGS. 8 to 12 illustrate cross sections of the backlight unit implemented as different structures for each for describing features clearly, but the backlight unit can be implemented by combining at least two structures among the structures illustrated in FIGS. 8 to 12. Furthermore, various structure of the optical plate 250 described above and the structures illustrated in FIGS. 8 to 12 can be combined to implement the backlight unit.

Referring to FIG. 8, the optical plate 250 can be positioned on the light source 220 and the reflector 230. The optical plate 250 can include the engraved pattern EP which is positioned on the light source 220 and in which the color conversion portion 251 is disposed.

A color conversion layer 800 including a color conversion material can be disposed on a top surface or a bottom surface of the optical plate 250.

The color conversion layer 800 can be formed by a method in which a color conversion material is applied on one surface of the optical plate 250. The color conversion layer 800 can be disposed separately from the optical plate 250.

The color conversion layer 800 can be seen as a part of the optical plate 250, or in some cases, can be a configuration separated from the optical plate 250.

A wavelength of light that a color conversion material included in the color conversion portion 251 emits can be different from a wavelength of a light that a color conversion material included in the color conversion layer 800 emits.

Among a color conversion material included in the color conversion portion 251 and a color conversion material included in the color conversion layer 800, a wavelength of light that a color conversion material positioned more adjacent to the light source 220 emits can be greater than a wavelength of a light that another color conversion material emits.

For example, in the case that the light source 220 emits a blue light, a color conversion material emitting a red light can be positioned more adjacent to the light source 220 than a color conversion material emitting a green light.

Such as Case A, the color conversion layer 800 can be disposed on a top surface of the optical plate 250. In this case, a color conversion material included in the color conversion portion 251 disposed in the engraved pattern EP can emit a red light. A color conversion material included in the color conversion layer 800 can emit a green light.

Such as Case B, the color conversion layer 800 can be disposed on a bottom surface of the optical plate 250. In this case, a color conversion material included in the color conversion layer 800 can emit a red light. A color conversion material included in the color conversion portion 251 disposed in the engraved pattern EP can emit a green light.

A color conversion material emitting a green light can be positioned on an upper portion than a color conversion material emitting a red light.

As a green light emitted by a color conversion material may not be converted to a red light, reducing of an amount of a green light can be prevented.

Furthermore, a layer reflecting a light of a certain wavelength can be added for increasing a supply of a green light and a red light.

Figure 9:
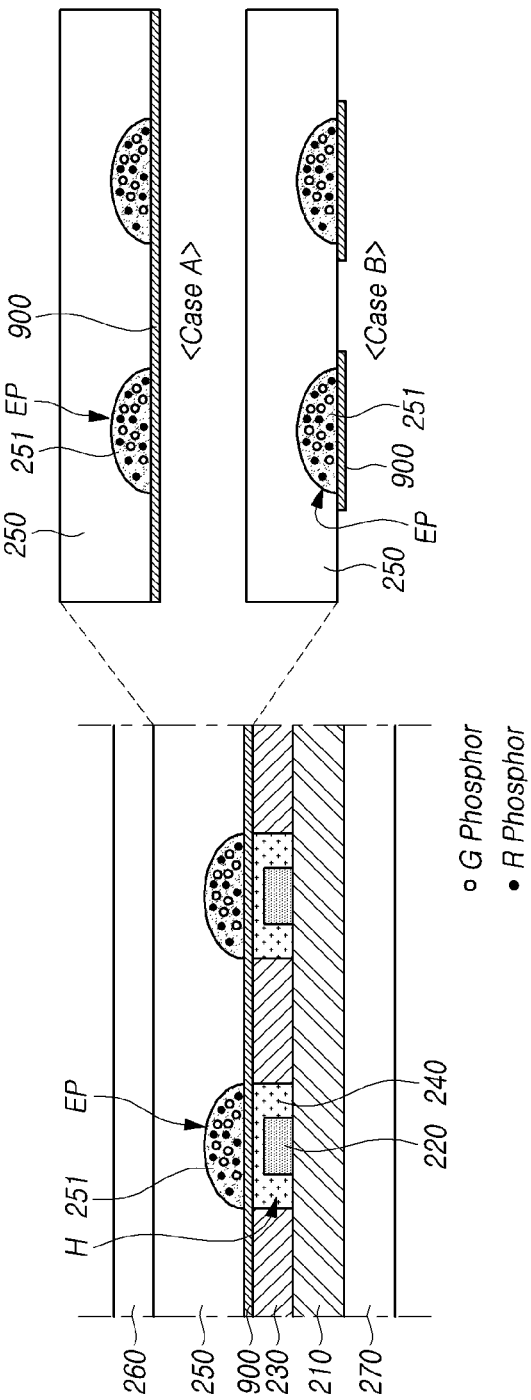

Referring to FIG. 9, the optical plate 250 can be disposed on the light source 220 and the reflector 230.

A reflection filter layer 900 can be disposed on a bottom surface.

The reflection filter layer 900 can be a part of the optical plate 250, or can be disposed separately from the optical plate 250.

The reflection filter layer 900 can transmit light of some wavelength, and can reflect light of some other wavelength.

The reflection filter layer 900 can transmit light emitted by the light source 220. The reflection filter layer 900 can reflect light emitted by a color conversion material positioned inside the engraved pattern EP of the optical plate 250.

For example, the reflection filter layer 900 can transmit a blue light, and can reflect a green light and a red light. The reflection filter layer 900 can improve an efficiency of light emitted by the color conversion portion 251.

The reflection filter layer 900 can be disposed on a bottom surface of the optical plate 250 entirely such as in Case A.

Alternatively, the reflection filter layer 900 can be disposed on a part area including an area where the color conversion portion 251 is disposed of a bottom surface of the optical plate 250.

In a structure illustrated in Case B, the light source 220 may not be positioned and the reflector 230 can be positioned in an area where the reflection filter layer 900 is not disposed. Such as the structure illustrated in Case B, as the area where the reflection filter layer 900 is disposed is minimized, light efficiency can be improved.

Furthermore, a layer for increasing a light diffusion performance can be added on at least one surface of a top surface or a bottom surface of the optical plate 250.

Referring to FIG. 10, a light diffusion layer 1000 including a plurality of protrusions can be disposed on at least one surface of a top surface or a bottom surface of the optical plate 250.

The light diffusion layer 1000 can be an embossed shape, or an engraved shape. The protrusion constituting the light diffusion layer 1000 can be a lens shape such as an example illustrated in FIG. 10, but can be made as various structures such as a pyramid, a cone, a shape dug as V-shape, or the like.

The light diffusion layer 1000 can be disposed on a top surface of the optical plate 250 entirely such as Case A.

The light diffusion layer 1000 can be disposed in an area corresponding to the hole H of the reflector 230 in which the light source 220 is disposed on a bottom surface of the optical plate 250 such as Case B.

The light diffusion layer 1000 can be disposed on both of a top surface and a bottom surface of the optical plate 250.

A light diffusion performance can be improved by the light diffusion layer 1000 disposed on at least one surface of a top surface or a bottom surface of the optical plate 250. Furthermore, an intentional air layer can be formed on an upper portion or a lower portion of the optical plate 250 by a protrusion shape of the light diffusion layer 1000, thus light diffusion performance can be improved.

Alternatively, an air layer can be formed by a structure of the light source protection portion 240 disposed on the light source 220.

Figure 11:
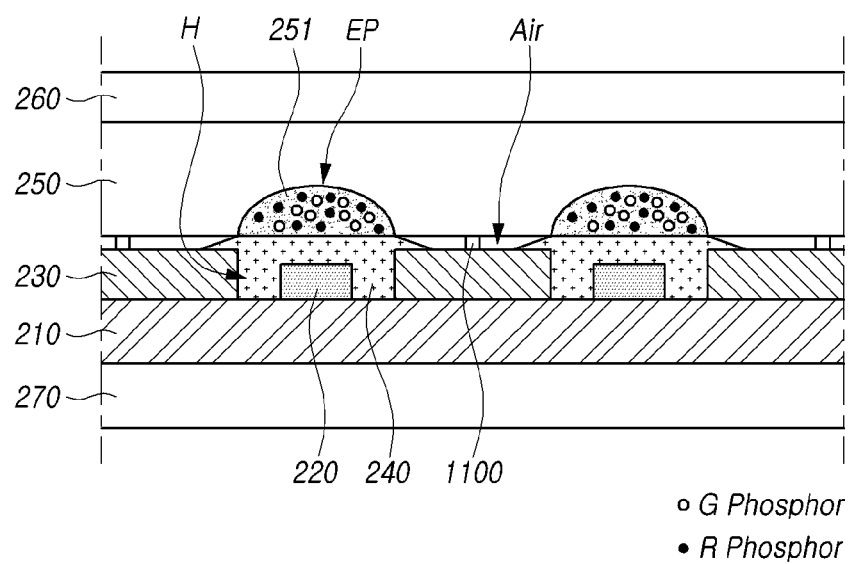

Referring to FIG. 11, the light source 220 can be disposed in the hole H of the reflector 230. The light source protection portion 240 can enclose the light source 220 and can be disposed in the hole H of the reflector 230.

The light source protection portion 240 can be disposed to overflow the hole H of the reflector 230. A portion of the light source protection portion 240 can be positioned on a periphery of the hole H of the reflector 230. A top end of the light source protection portion 240 can be positioned higher than a top end of the reflector 230.

A top surface of the light source protection portion 240 can support the optical plate 250.

An air layer can be formed between a bottom surface of the optical plate 250 and a top surface of the reflector 230. A support tape 1100 can be disposed on the reflector 230 in an area between the light sources 220 and can support the optical plate 250.

Contrary to a structure illustrated in FIG. 11, the light source protection portion 240 can be disposed in the hole H of the reflector 230 not to be enough.

A top end of the light source protection portion 240 can be positioned lower than a top end of the reflector 230.

The optical plate 250 can be supported by the reflector 230. An air layer can be formed between the optical plate 250 and the light source protection portion 240.

Such as structures illustrated in FIGS. 10 and 11, by forming an air layer on an upper portion or a lower portion of the optical plate 250 by the light diffusion layer 1000 or a structure of the light source protection portion 240, a light diffusion performance can be improved.

Furthermore, by arranging a light scattering material in at least a part inside of the optical plate 250, a light diffusion performance can be improved.

Referring to FIG. 12, a light scattering material such as TiO2 or SiO2 can be disposed in at least a part of the optical plate 250. TiO2 and SiO2 can be disposed as same ratio, or as different ratio.

Such as Case A, a light scattering material can be disposed in a first portion 250*a* of the optical plate 250. A light scattering material may not be disposed in a second portion 250*b* of the optical plate 250.

The first portion 250*a* of the optical plate 250 can be a portion surrounding the engraved pattern EP. As light passing through the color conversion portion 251 inside of the engraved pattern EP is scattered in the first portion 250*a* of the the optical plate 250, the efficiency of a color conversion material included in the color conversion portion 251 can be improved.

Alternatively, such as Case B, a light scattering material can be disposed in the optical plate 250 entirely. Two or more light scattering material can be disposed in the optical plate 250. A wavelength conversion efficiency and an image quality by the optical plate 20 in which the color conversion portion 251 is disposed can be improved by adjusting the ratio of two or more light scattering material disposed in the optical plate 250.

The embodiments of the present disclosure described above will be briefly described as follows.

A backlight unit according to embodiments of the present disclosure can include a plurality of light sources 220 disposed on a substrate 210, a reflector 230 disposed on the substrate 210 and including a plurality of holes H and wherein at least some of the plurality of holes H are positioned to correspond to each of the plurality of light sources 220, and an optical plate 250 positioned on the plurality of light sources 220 and the reflector 230 and including a plurality of engraved patterns EP positioned in an area corresponding to each of the plurality of light sources 220 on a bottom surface and wherein a color conversion portion 251 including a color conversion material is disposed inside each of the plurality of engraved patterns EP.

A size of each of the plurality of engraved patterns EP can be greater or equal to a size of each of the plurality of holes H.

A vertical distance between the deepest point in the plurality of engraved patterns EP and a top surface of the optical plate 250 can be greater than a vertical distance between the point and a bottom surface of the optical plate 250.

A refractive index of the color conversion portion 251 can be greater or equal to a refractive index of the optical plate 250.

The optical plate 250 can further include at least one auxiliary engraved pattern EPs positioned along an outer edge of the optical plate 250 and wherein an auxiliary color conversion portion 252 including a color conversion material is disposed in the at least one auxiliary engraved pattern EPs.

The at least one auxiliary engraved pattern EPs can be positioned in an area other than an area overlapping the plurality of light sources 220.

A depth of the at least one auxiliary engraved pattern EPs can be smaller than a depth of each of the plurality of engraved patterns EP.

The at least one auxiliary engraved pattern EPs can be positioned on a surface on which the plurality of engraved patterns EP are positioned among both surfaces of the optical plate 250.

The optical plate 250 can further include at least one additional engraved pattern EPa positioned in an area other than an area corresponding to each of the plurality of light sources 220 and positioned in an area corresponding to one of the plurality of holes H.

A circuit component 600 can be disposed inside of a hole H corresponding to the at least one additional engraved pattern EPa among the plurality of holes H.

An additional color conversion portion 253 including a color conversion material can be disposed inside of the at least one additional engraved pattern EPa. Furthermore, a light blocking layer can be disposed on outside surface of the additional color conversion portion 253 exposed to outside of the optical plate 250.

Alternatively, a light blocking portion 254 including a light diffusion material can be disposed inside of the at least one additional engraved pattern EPa.

The backlight unit can further include a color conversion layer 800 disposed on a top surface or a bottom surface of the optical plate 250 and including a color conversion material. Among the color conversion material included in the color conversion portion 251 and the color conversion material included in the color conversion layer 800, a wavelength of a light that the color conversion material more adjacent to the plurality of light sources 220 emits can be greater than a wavelength of a light that another color conversion material emits.

The backlight unit can further include a reflection filter layer 900 disposed on at least a part area between the optical plate 250 and the plurality of light sources 220, transmitting a light emitted from the plurality of light sources 220, and reflecting a light emitted by the color conversion material.

The backlight unit can further include a light diffusion layer 1000 disposed on at least one surface of a top surface or a bottom surface of the optical plate 250 and including a plurality of protrusions. The light diffusion layer 1000 can be disposed on the bottom surface of the optical plate 250 and positioned in an area overlapping each of the plurality of engraved patterns EP.

An air layer can be present between the plurality of light sources 220 and the optical plate 250, or an air layer can be present between the reflector 230 and the optical plate 250.

At least a portion of the optical plate 250 can include a light scattering material.

A backlight unit according to embodiments of the present disclosure can include a plurality of light sources 220 disposed on a substrate 210, a reflector 230 disposed on the substrate 210 and disposed on at least a part area other than an area where the plurality of light sources 220 are disposed, and an optical plate 250 positioned on the reflector 230.

The optical plate 250 can include a plurality of first engraved patterns positioned in an area corresponding to each of the plurality of light sources 220, and at least one second engraved patterns positioned in an area other than an area corresponding to each of the plurality of light sources 220. A color conversion portion including a color conversion material can be disposed inside of the plurality of first engraved patterns and the at least one second engraved pattern.

According to embodiments of the present disclosure, by arranging a color conversion material inside the engraved pattern EP included in the optical plate 250, a characteristic change of the color conversion material by an external factor can be prevented.

As the optical plate 250 in which a color conversion material is disposed inside the engraved pattern EP is disposed on the light source 220 and the reflector 230, an amount of the color conversion material can be reduced, and the backlight unit providing an image quality of a certain level can be implemented easily.

Furthermore, the optical plate 250 can further include the auxiliary engraved pattern EPs or the additional engraved pattern EPa positioned on an area other than an area overlapping the light source 220. If necessary, a color conversion material or a light diffusion material can be disposed inside the auxiliary engraved pattern EPs and the additional engraved pattern EPa. The backlight unit with improved image quality and a simplified structure can be implemented easily by the auxiliary engraved pattern EPs and the additional engraved pattern EPa.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A display device, comprising:
   a display panel; and
   a backlight unit configured to supply light to the display panel, and
   wherein the backlight unit comprises:
   a plurality of light sources on a substrate;
   a reflector on the substrate including a plurality of holes, and wherein each of the plurality of holes is configured to accommodate one of the light sources; and
   an optical plate positioned on the plurality of light sources and the reflector and wherein the optical plate further comprises a plurality of engraved patterns on a bottom surface corresponding to each of the plurality of light sources and a color conversion portion including a color conversion material which is disposed inside of the plurality of engraved patterns,
   wherein the optical plate further comprises:
   at least one auxiliary engraved pattern positioned along an outer edge of the optical plate, and wherein an auxiliary color conversion portion including a color conversion material is disposed in the at least one auxiliary engraved pattern,
   wherein the at least one auxiliary engraved pattern does not overlap the plurality of light sources.

2. The display device of claim 1, wherein a size of the plurality of engraved patterns is greater or equal to a size of each of the plurality of holes.

3. The display device of claim 1, wherein a vertical distance between the deepest point of a concave part of the plurality of engraved patterns and a top surface of the optical plate is greater than a vertical distance between the deepest point and a bottom surface of the optical plate.

4. The display device of claim 1, wherein a refractive index of the color conversion portion is greater than or equal to a refractive index of the optical plate.

5. The display device of claim 1, wherein a depth of the at least one auxiliary engraved pattern is smaller than a depth of each of the plurality of engraved patterns.

6. The display device of claim 1, wherein the at least one auxiliary engraved pattern is positioned on a surface on which the plurality of engraved patterns are on a surface of the optical plate.

7. The display device of claim 1, wherein the optical plate further comprises:
   at least one additional engraved pattern positioned in an area not corresponding to each of the plurality of light sources, and positioned in an area corresponding to one of the plurality of holes.

8. The display device of claim 7, wherein a hole corresponding to the at least one additional engraved pattern among the plurality of holes accommodates a circuit component.

9. The display device of claim 7, wherein an additional color conversion portion including a color conversion material is disposed inside of the at least one additional engraved pattern.

10. The display device of claim 9, further comprising:
    a light blocking layer disposed on an outside surface of the additional color conversion portion exposed to outside of the optical plate.

11. The display device of claim 7, wherein a light blocking portion including a light diffusion material is disposed inside of the at least one additional engraved pattern.

12. The display device of claim 1, further comprising:
    a color conversion layer disposed on a top surface or a bottom surface of the optical plate and including a color conversion material, and
    wherein, among the color conversion material included in the color conversion portion and the color conversion material included in the color conversion layer, a wavelength of a light that the color conversion material more adjacent to the plurality of light sources emits is greater than a wavelength of a light that another color conversion material emits.

13. The display device of claim 1, further comprising:
    a reflection filter layer disposed on at least a part area between the optical plate and the plurality of light sources, transmitting light emitted from the plurality of light sources, and reflecting light emitted by the color conversion material.

14. The display device of claim 1, further comprising:
    a light diffusion layer disposed on at least one surface of a top surface or a bottom surface of the optical plate and including a plurality of protrusions.

15. The display device of claim 14, wherein the light diffusion layer is disposed on the bottom surface of the optical plate, and overlapping each of the plurality of engraved patterns.

16. The display device of claim 1, wherein an air layer is present between the plurality of light sources and the optical plate, or an air layer is present between the reflector and the optical plate.

17. The display device of claim 1, wherein at least a portion of the optical plate includes a light scattering material.

18. A backlight unit, comprising:
    a plurality of light sources on a substrate;
    a reflector on the substrate disposed on at least a part of an area not overlapping the plurality of light sources; and
    an optical plate positioned on the reflector, and
    wherein the optical plate comprises:
    a plurality of first engraved patterns corresponding to each of the plurality of light sources, and at least one second engraved patterns not corresponding to the plurality of light sources, wherein a color conversion portion including a color conversion material is disposed inside of the plurality of first engraved patterns and the at least one second engraved pattern, wherein the at least one second engraved patterns is positioned along an outer edge of the optical plate.

19. The backlight unit of claim 18, wherein the at least one second engraved patterns is positioned to surround an area on which the plurality of light sources are disposed.

20. The backlight unit of claim 18, wherein a depth of the at least one second engraved patterns is smaller than a depth of each of the plurality of first engraved patterns.

21. The backlight unit of claim 18, wherein the reflector comprises a plurality of holes, and at least one of the plurality of first engraved or the at least one second engraved patterns overlaps one of the plurality of holes.

22. The backlight unit of claim 21, wherein each of the plurality of first engraved patterns overlaps the hole, and the at least one second engraved patterns does not overlap one of the plurality of holes.

23. The backlight unit of claim 18, wherein the plurality of first engraved patterns and the at least one second engraved patterns are on a same surface of the optical plate.

* * * * *